US005493307A

United States Patent [19]

Tsujimoto

[11] Patent Number: 5,493,307

[45] Date of Patent: Feb. 20, 1996

[54] MAXIMAL DEVERSITY COMBINING INTERFERENCE CANCELLATION USING SUB-ARRAY PROCESSORS AND RESPECTIVE DELAY ELEMENTS

[75] Inventor: Ichiro Tsujimoto, Tokyo, Japan

[73] Assignee: NEC Corporation, Tokyo, Japan

[21] Appl. No.: 451,140

[22] Filed: May 26, 1995

[30] Foreign Application Priority Data

May 26, 1994 [JP] Japan .................................... 6-138389

[51] Int. Cl.[6] ................................ G01S 3/16; G01S 3/28

[52] U.S. Cl. ........................... 342/380; 342/381; 342/375

[58] Field of Search .................................... 342/375, 380, 342/381, 382, 383, 384

[56] References Cited

U.S. PATENT DOCUMENTS

| | | | |
|---|---|---|---|
| 4,720,712 | 1/1988 | Brookner et al. | 342/383 |
| 4,771,289 | 9/1988 | Masak | 342/383 |
| 5,369,412 | 11/1994 | Tsujimoto | 342/380 |

*Primary Examiner*—Theodore M. Blum
*Attorney, Agent, or Firm*—Sughrue, Mion, Zinn, Macpeak & Seas

[57] ABSTRACT

A sidelobe canceler includes a main antenna, an array of sub-antennas, a subtractor having a first input connected to the main antenna, a main-array processor and M sub-array processors. The main-array processor multiplies the outputs of the sub-antennas with weight coefficients using correlations between the sub-antenna outputs and the subtractor output and combines the multiplied signals into a signal, which is coupled to the second input of the subtractor. The signal-to-noise ratio of the subtractor output is maximized by an adaptive matched filter. Each sub-array processor multiplies the sub-antenna outputs with weight coefficients using correlations between the sub-antenna outputs and a decision signal. The multiplied signals are summed to produce an output of each sub-array processor, which is combined with the outputs of the other sub-array processors into a first diversity-combined signal, the latter being combined with the matched filter output to produce a second diversity-combined signal. Intersymbol interference is removed by an adaptive equalizer from the second diversity-combined signal according to a decision error so that the decision signal is produced and applied to the sub-array processors. Different amounts of delay are introduced to the outputs of (M−1) of the sub-array processors so that the output of the i-th sub-array processor is delayed by (i−1)τ, where i=2,3, . . . , M, and different amounts of delay are introduced to the decision signals applied to (M−1) of the sub-array processors so that the decision signal applied to the j-th sub-array processor is delayed by (M−j)τ, where j=1,2, . . . , M−1. The total amounts of delay associated with each of the M sub-array processors is equal to (M−1)τ.

6 Claims, 5 Drawing Sheets

MAXIMAL DEVERSITY COMBINING INTERFERENCE CANCELLATION USING SUB-ARRAY PROCESSORS AND RESPECTIVE DELAY ELEMENTS

BACKGROUND OF THE INVENTION

1. Field of the Invention

The present invention relates generally to techniques for canceling interfering signals, and more specifically to a sidelobe canceler using an array of sub-antennas for canceling interference introduced through the sidelobes of the main antenna.

2. Description of the Related Art

A prior art sidelobe canceler for a main antenna has an array of sub-antennas connected to multipliers where their output signals are respectively weighted with coefficients supplied from an Applebaum weight controller which operates according to the Applebaum algorithm as described in "Adaptive Arrays", IEEE Transactions on Antennas and Propagation, Vol. AP-24, No. 5, 1976. The outputs of the multipliers are summed together into a sum signal which is subtracted in a subtractor from the output of the main antenna. The subtractor output is supplied to the Applebaum weight controller where it is used as a reference signal to produce the weight coefficients. The Applebaum algorithm is based on the minimum mean square error (MMSE) algorithm and an additional steering vector which represents an estimated arrival direction of the undesired signal. The components of the steering vector are respectively added to the weight coefficients in the correlation loops, so that the directional pattern of the antenna array is oriented toward the source of undesired signal and the signals detected by the array are summed together and used to cancel the undesired signal contained in the output of the main antenna.

The output of the subtractor is further applied to an adaptive equalizer where multipath fading related intersymbol interference is canceled. If the time difference between multipath signals becomes smaller than a certain value, the fading pattern changes from frequency selective mode to flat fading, i.e., a fade occurs over the full bandwidth of the desired signal, making it impossible to equalize the desired signal. In such a situation, diversity reception technique is used.

In addition, a component of the desired signal is also received by the adaptive antenna array and combined with the main antenna signal. Under certain amplitude-phase conditions, the phases of these signals become opposite to each other, canceling part or whole of the desired signal.

U.S. Pat. No. 5,369,412, issued to I. Tsujimoto, Nov. 29, 1994, discloses a sidelobe canceler including an array of sub-antennas, an Applebaum weight controller for controlling the weight coefficients of a first array of multipliers, and a correlator for controlling the weight coefficients of a second array of multipliers according to the output of an adaptive equalizer. The outputs of the sub-antenna array are weighted by the coefficients of the first array of multipliers, and summed together to produce a canceling signal. The outputs of the sub-antenna array are further weighted by the coefficients of the second array of multipliers, summed together to produce a diversity signal. After being combined with the diversity signal and the canceling signal, the main antenna signal is fed into the adaptive equalizer for canceling intersymbol interference.

SUMMARY OF THE INVENTION

It is therefore an object of the present invention to provide an improved technique for interference cancellation and maximal diversity combining using a common sub-antenna array.

Another object of the present invention is to remove interference that is introduced to sub-array processors through the sidelobes of steered directivity patterns of the sub-antenna arrays.

According to a broader aspect, the present invention provides a sidelobe canceler comprising a main antenna, an array of sub-antennas, a subtractor having a first input connected to the main antenna, a main-array processor and M sub-array processors. The main-array processor has a plurality of first weight multipliers for multiplying output signals of the sub-antennas with weight coefficients, a first weight controller for detecting correlations between the output signals of the sub-antennas and an output signal of the subtractor and deriving therefrom the weight coefficients of the first multipliers, and a first adder for summing output signals of the first multipliers to produce an output signal and supplying the output signal to the second input of the subtractor as an interference canceling signal. An adaptive matched filter is provided for receiving the output signal of the subtractor to produce an output signal having a maximized signal-to-noise ratio. Each of the M sub-array processors has a plurality of second multipliers for multiplying the output signals of the sub-antennas with weight coefficients, a second weight controller for detecting correlations between the output signals of the sub-antennas and a decision signal and deriving therefrom the weight coefficients of the second multipliers, and a second adder for summing output signals of the second multipliers to produce an output signal of each of the sub-array processors. The output signals of the M sub-array processors are combined into a first diversity-combined signal and the first diversity-combined signal is combined with the output signal of the matched filter to produce a second diversity-combined signal. Intersymbol interference is removed from the second diversity-combined signal according to a decision error so that the decision signal is produced for the sub-array processors. Different amounts of delay are introduced to the output signals of (M−1) of the sub-array processors so that the output signal of the i-th sub-array processor is delayed by an amount equal to $(i-1)\tau$, where $i=2,3, \ldots, M$ and $\tau$ is a predetermined delay time, and different amounts of delay are introduced to the decision signals applied to (M−1) of the sub-array processors so that the decision signal applied to the j-th sub-array processor is delayed by an amount equal to $(M-j)\tau$, where $j=1,2, \ldots, M-1$, wherein the total amounts of delay associated with each of the M sub-array processors is equal to $(M-1)\tau$.

According to a second aspect, the present invention provides a sidelobe canceler comprising, a main antenna, an array of sub-antennas, a subtractor having a first input connected to the main antenna, a main-array processor and M sub-array processors. The main-array processor has a plurality of first weight multipliers for multiplying output signals of the sub-antennas with weight coefficients, a first weight controller for detecting correlations between the output signals of the sub-antennas and an output signal of the subtractor and deriving therefrom the weight coefficients of the first multipliers, and a first adder for summing output signals of the first multipliers to produce an output signal and supplying the output signal to the second input of the subtractor as an interference canceling signal. An adaptive matched filter receives the output signal of the subtractor and produces an output signal having a maximized signal-to-noise ratio. Each of the M sub-array processors has a plurality of second multipliers for multiplying the output signals of the sub-antennas with weight coefficients, a second weight controller for detecting correlations between the output signals of the sub-antennas and a decision signal and deriving therefrom the weight coefficients of the second multipliers, and a second adder for summing output signals of the second multipliers to produce an output signal of each of the sub-array processors. An adaptive equalizer removes intersymbol interference according to a decision error to produce a decision signal and applies the decision signal to the sub-array processors. The output signals of the M sub-array processors are combined into a first diversity-combined signal, and the frequency spectrum of the output signal of the main-array processor is transversal-filtered using the decision error of the adaptive equalizer according to a minimum means square error algorithm to produce an interference canceling signal. The interference canceling signal is combined with the first diversity combined signal to cancel an interfering signal introduced to the M sub-array processors by the sidelobes of the sub-antennas. The interference-canceled first diversity-combined signal is combined with the output signal of the matched filter to produce a second diversity-combined signal which is applied to the adaptive equalizer to remove intersymbol interference therefrom. Different amounts of delay are introduced to the output signals of (M−1) of the sub-array processors so that the output signal of the i-th sub-array processor is delayed by an amount equal to $(i-1)\tau$, where $i=2,3, \ldots, M$. Different amounts of delay are introduced to the decision signals applied to (M−1) of the sub-array processors so that the decision signal applied to the j-th sub-array processor is delayed by an amount equal to $(M-j)\tau$, where $j=1,2, \ldots, M-1$, wherein the total amounts of delay associated with each of the M sub-array processors is equal to $(M-1)\tau$.

BRIEF DESCRIPTION OF THE DRAWINGS

The present invention will be described in further detail with reference to the accompanying drawings, in which.

DETAILED DESCRIPTION

Figure 1:
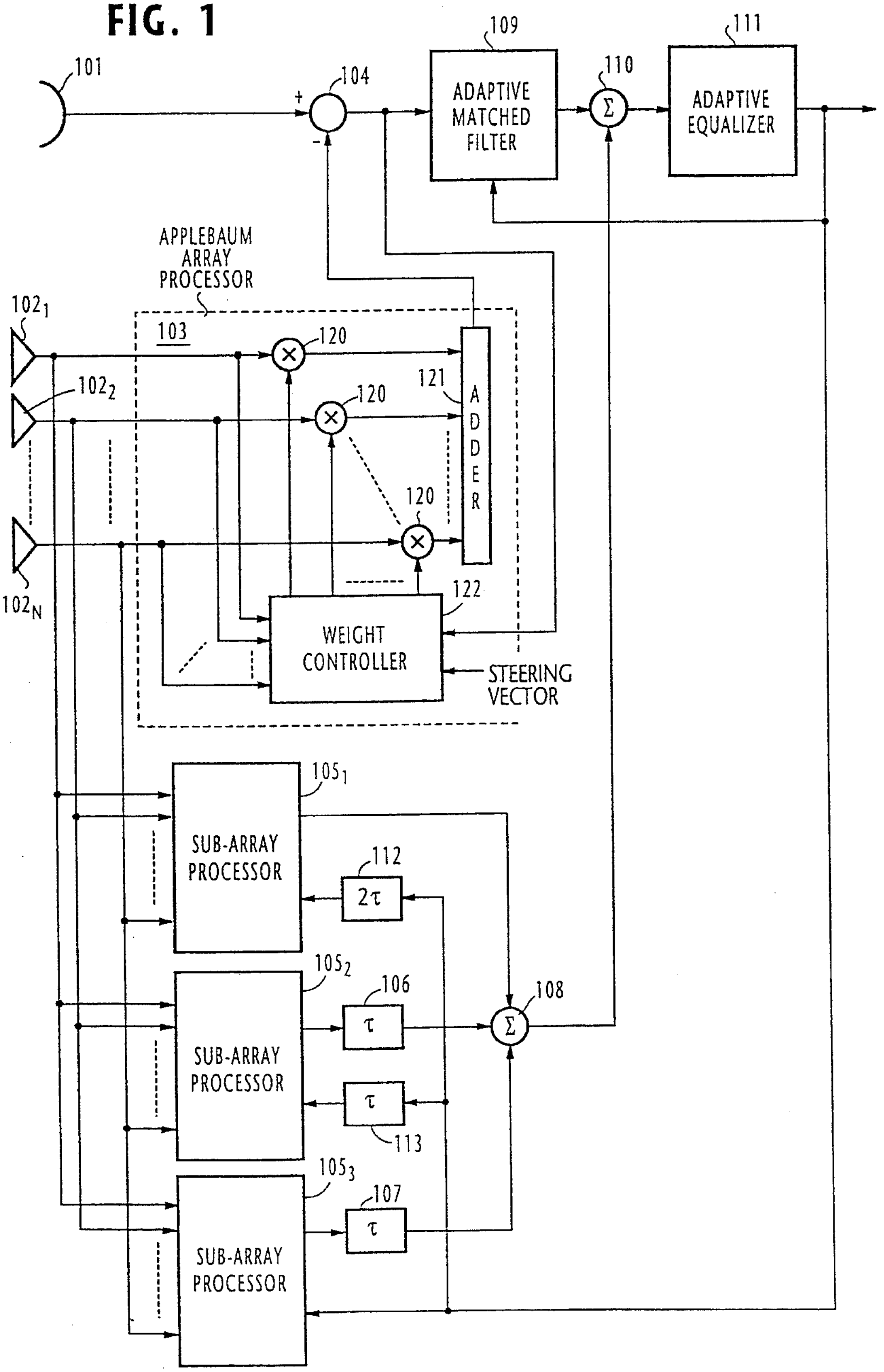
FIG. 1 is a block diagram of a sidelobe canceler according to a first embodiment of the present invention.
Figure 2:
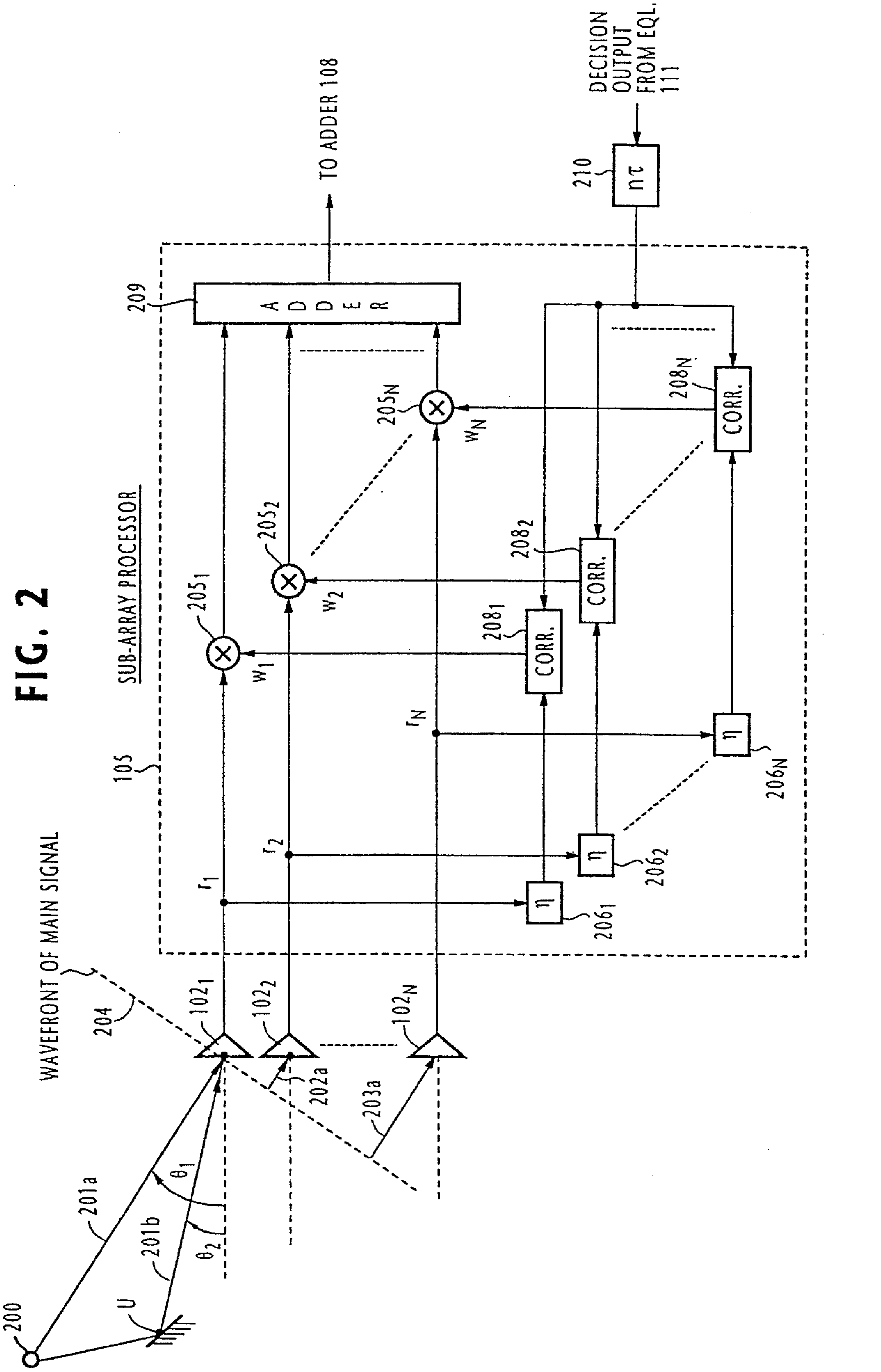
FIG. 2 is a block diagram of a sub-array processor.

Referring now to FIG. 1, there is shown a sidelobe canceler according to a first embodiment of the present invention. The sidelobe canceler consists of a main antenna 101, an array of sub-antennas $\mathbf{102}_1$ through $\mathbf{102}_N$, an Applebaum (main) array processor 103 connected to the sub-antennas, and a subtractor 104 where the main antenna signal is combined in opposite sense with the output of the Applebaum array processor 103. The sub-antennas $\mathbf{102}_1$~$\mathbf{102}_N$ are spaced apart at the half-wavelength of the carrier frequency of the incoming signal. Further connected to the sub-antennas are a plurality of sub-array processors, the details of which are shown in FIG. 2. For simplicity, only three sub-array processors $\mathbf{105}_1$, $\mathbf{105}_2$ and $\mathbf{105}_3$ are shown.

The output of subtractor 104 is divided into a first path leading to the Applebaum array processor 103 and a second path leading to an adaptive matched filter 109 of well-known design which uses the decision output of an adaptive equalizer 111 such as decision-feedback equalizer to control the tap-weight coefficients of the matched filter 109.

The Applebaum array processor 103 includes a plurality of weight multipliers 120 connected respectively to the sub-antennas $\mathbf{102}_1$~$\mathbf{102}_N$ for multiplying the outputs of the sub-antennas by weight coefficients supplied from a weight controller 122, and an adder 121 for summing the outputs of the multipliers 120. As described in the aforesaid Tsujimoto U.S. Patent, the weight controller 122 consists of a correlator which takes correlations between the sub-antenna signals and a difference signal from subtractor 104 to produce a plurality of correlation signals. The correlation signals are combined with the components of a steering vector which indicates an estimated arrival angle of an interfering signal to be detected. The vector-combined correlation signals are supplied to the multipliers 120 as the respective weight coefficients for weighting the sub-antenna signals, respectively. The output of the adder 121 is an interference canceling signal, which is subtracted in the subtractor 104 from the output of main antenna 101 to cancel the interfering signal contained in it.

The output of the adaptive equalizer 111 is further applied through a delay element 112 with delay time $2\tau$ to the sub-array processor $\mathbf{105}_1$, through a delay element 113 with delay time $\tau$ to the sub-array processor $\mathbf{105}_2$ and without delay to the sub-array processor $\mathbf{105}_3$. To the inputs of an adder 108 are applied the output of sub-array processor $\mathbf{105}_1$ without delay, the output of sub-array processor $\mathbf{105}_2$ through a delay element 106 with delay time $\tau$, and the output of sub-array processor $\mathbf{105}_3$ through a delay element 107 having delay time $2\tau$. The signals applied to the adder 108 produces a diversity combining signal which is supplied to a combiner 110 where it is combined with the main antenna signal from the matched filter 109. Adaptive equalizer 111 operates on the output of the diversity combined signal to produce the decision output.

As illustrated in FIG. 2, each of the sub-array processors 105 consists of complex multipliers $\mathbf{205}_1$~$\mathbf{205}_N$ connected to the sub-antennas $\mathbf{102}_1$~$\mathbf{102}_N$, respectively. The output signals $r_1$~$r_N$ of the sub-antennas are also applied through delay elements $\mathbf{206}_1$~$\mathbf{206}_N$ with delay time $\eta$ to correlators $\mathbf{208}_1$~$\mathbf{208}_N$ where the correlations are taken between the outputs of the sub-antennas and the decision output which is supplied from the adaptive equalizer 111 with delay provided by a delay element 210 representing the delay elements 112, 113. The delay element 210 introduces a delay time $n\tau$, where n is 2, 1 and 0 in the case of sub-array processors $\mathbf{105}_1$, $\mathbf{105}_2$ and $\mathbf{105}_3$, respectively. The delay time $\eta$ is equal to $\tau+\alpha$, where $\alpha$ is the amount of delay between the arrival time of a main-path sample at each sub-antenna and the time at which the corresponding decision sample of adaptive equalizer 111 is available at the inputs of the correlators $\mathbf{208}_1$~$\mathbf{208}_N$. The weighting signals $w_1$~$w_N$ from the correlators $\mathbf{208}_1$~$\mathbf{208}_N$ are supplied to the multipliers $\mathbf{205}_1$~$\mathbf{205}_N$, respectively, for multiplying the outputs of the sub-antennas. The outputs of the multipliers 205 are summed in an adder 209 and fed to the adder 108.

In a multipath fading environment, the desired signal suffers from unfavorable factors such as scattering, reflections and diffractions, so that the replicas of the signal are propagated over multiple paths to the destination and arrive at different angles at different times. Since the individual paths have different propagation lengths, the received signals are delay-dispersed over time. In other words, the arrival angles correspond to the amounts of propagation delay, respectively. It is thus possible to selectively receive multipath returns arriving at particular angles by adaptively controlling the sub-array processors 105$_1$~105$_N$ so that the beams (mainlobes) of the corresponding sub-antennas are respectively oriented in the particular directions. For a three-wave multipath model in which the signals are represented as S(−τ), S(0) and S(+τ), where S(0) is the main component and S(−τ) and S(+τ) are the multipath components with leading and lagging phase angles, respectively, relative to the phase of the main signal. Specifically, if it is desired to cause the sub-array processors 105$_1$, 105$_2$ and 105$_3$ to individually receive the components S(+τ), S(0) and S(−τ), each of these processors controls the beams of the sub-antennas 102$_1$~102$_N$ to extract the particular component in a manner as will be described later.

In addition, since the different propagation paths suffer from different fades. For example, there is a deep fade in the main path, while one or both of multipath returns are not affected by fades. In such a situation, one or more fade-unaffected multipath returns can be used to produce a space-diversity combining signal by summing the outputs of the sub-array processors 105$_1$~105$_3$.

Since the input signals to the sub-array processors are delay-dispersed multipath signals, the diversity combining with the main antenna signal can be considered to be a time-domain diversity combining if the multipath fading is taken to be a channel response. Because of the multipath timing differences, the delay elements 106 and 107 are used to introduce a delay time τ to the output signal S(0) of the sub-array processor 105$_2$ and a delay time 2τ to the output signal S(−τ) of the sub-array processor 105$_3$. No delay time is introduced to the output signal S(+τ) of sub-array processor 105$_1$. As a result, all the multipath fading channels are aligned to the phase timing of the signal S(+τ), so that they can be simultaneously combined by the adder 108.

If the amplitudes of these signals are squared and combined in phase with each other, the combining is maximal ratio diversity combining in the time domain. The gain obtained in this manner is equal to the implicit diversity gain which would be obtained by the use of a matched filter, so that significant improvement can be achieved in the signal-to-noise ratio versus bit-error rate performance of a sidelobe canceler without using an error correction technique which would require a substantial amount of bandwidth due to the redundancy of codes. In other words, a coding gain is achieved by eliminating the need to increase the signal bandwidth.

In addition, the signal received by the main antenna 101 is also a multipath-fading related, delay-dispersed signal. The use of the adaptive matched filter 109 is to converge the time-dispersed components of the desired signal to the reference timing. Specifically, the adaptive matched filter 109 is a transversal filter where the tap-weight coefficients of the filter's delay line are adaptively controlled in accordance with the decision output of adaptive equalizer 111 so that the complex conjugate of their time reversals are equal to the channel impulse response.

On the other hand, the combining of the outputs of the sub-array processors 105$_1$~105$_3$ by adder 108 is a matched filtering in the space domain. Thus, the output of adder 108 is a sum of the space-dispersed components of the desired signal whose signal-to-noise ratios are maximized by the respective sub-antenna branches. As a result, a maximal ratio combining is achieved by combiner 110. The output of combiner 110 is supplied to the equalizer 111 where the intersymbol interference is removed.

A detailed description of the operation of the sub-array processors 105$_1$~105$_3$ of FIG. 1 will be given below using a simplified, two-wave propagation model with reference to FIG. 2 in which only one sub-array processor 150 is shown as a representative of the sub-array processors and a delay element 210 is illustrated to represent each of the delay elements 112 and 113. The two-wave propagation model consists of a main-path component vector 201*a* arriving at an angle $\theta_1$ at the sub-antenna 102$_1$ and a delayed component vector 201*b* which has reflected off at a point U (undesired signal source) and is arriving at the sub-antenna 102$_1$ at an angle $\theta_2$. A desired signal S transmitted from a source 200 is propagated over different paths, creating a wavefront 204 of the main component of the desired signal at the sub-antenna 102$_1$. The components of the signal arrive at sub-antennas 102$_1$, 102$_2$ and 102$_N$ at different time instants. The direct signals arriving at sub-antennas 102$_2$ and 102$_N$ are indicated respectively as vectors 202 and 203 which are parallel to the main-path component vector 201*a* from source 200 and sub-antenna 102$_1$.

Since the length of a main-path component vector from source 200 to sub-antenna 102$_2$ is much greater than the spacing between sub-antennas 102$_1$ and 102$_2$, as well as the spacing between sub-antennas 102$_1$ and 102$_N$, the vectors 202 and 202 can be regarded as parallel to the main-path component vector 201*a*. In addition to the main-path component vectors 202 and 203, delayed component vectors, which can also be regarded as parallel to the delayed component vector 201*b*, are also incident on the sub-antennas 102$_2$ and 102$_N$ at angles $\theta_1$ and $\theta_2$, respectively. Since the sub-antennas are equally spaced at half-wavelength intervals, a phase difference $\phi_1$ exists between adjacent ones of the sub-antennas with respect to the signal arriving at angle $\theta_1$ and a phase difference $\phi_2$ exists between adjacent sub-antennas with respect to the signal arriving at angle $\theta_2$ as follows:

$$\phi_1=\pi\cdot\sin\theta_1 \tag{1}$$

$$\phi_2=\pi\cdot\sin\theta_2 \tag{2}$$

Therefore, the output signals $r_1$~$r_N$ of sub-antennas 102$_1$~102$_N$ are given by the following Equation.

$$r_1=\begin{bmatrix} r_1\\ r_2\\ \cdot\\ \cdot\\ r_N \end{bmatrix}=h_0S(0)\begin{bmatrix} 1\\ \exp(-j\phi_1)\\ \cdot\\ \cdot\\ \exp(-jN\phi_1) \end{bmatrix}+h_1S(\tau)\begin{bmatrix} 1\\ \exp(-j\phi_2)\\ \cdot\\ \cdot\\ \exp(-jN\phi_2) \end{bmatrix} \tag{3}$$

where, $h_0$ and $h_1$ are the main and delayed components of the channel impulse response sampled at instants t=0 and t=τ, respectively. Since the delay time η of each delay element 206 is equal to τ+α, and α is the amount of delay between the arrival time of a main-path sample at each sub-antenna and the time the corresponding decision output sample is fed back to the inputs of the correlators 208$_1$~208$_N$, as described above, the components of the main-path signal S(0) which are received by sub-antennas 102$_1$~102$_N$ are respectively delayed by amounts η=τ+α by delay elements 206$_1$~206$_N$ and applied to correlators 208$_1$~208$_N$. Therefore, the main-path input samples to these correlators are represented as S(τ+α), and the decision output samples applied thereto from equalizer 111 are represented as $\hat{S}$(α+nτ) which takes account of the delays α+nτ introduced by matched filter 109, adaptive filter 111 and delay element 210. As a result, both of the samples at the inputs of each correlator are coincident at reference time $\tau+\alpha$.

The operation of each of the sub-array processors will be given first to sub-array processor 105$_2$ for steering the directional patterns of the sub-antennas to the desired signal source 200 by setting the factor "n" of delay element 210 to "1".

In the case of the sub-array processor 105$_2$, correlations are taken between main-path samples S(0) and decision samples $\tilde{S}$(0) to produce a weight coefficient vector W (=$w_1$~$w_N$) as follows.

$$W = \begin{bmatrix} W_1 \\ W_2 \\ \cdot \\ \cdot \\ W_N \end{bmatrix} = E[r^* \cdot \tilde{S}(0)] \tag{4}$$

$$= h_0^* E[S^*(0)\tilde{S}(0)] \begin{bmatrix} 1 \\ \exp(+j\phi_1) \\ \cdot \\ \cdot \\ \exp(+jN\phi_1) \end{bmatrix} + h_1^* E[S^*(\tau)\tilde{S}(0)] \begin{bmatrix} 1 \\ \exp(+j\phi_2) \\ \cdot \\ \cdot \\ \exp(+jN\phi_2) \end{bmatrix}$$

where E[ ] represents an expected value obtained by a time averaging process and the symbol (*) represents complex conjugate.

In most cases, the time taken by the averaging process is much greater than the symbol intervals at which the information is modulated onto the carrier (corresponding to the data transmission speed), but much smaller than the intervals at which fading occurs. Therefore, the fading-related variations are not averaged out into insignificant power. Furthermore, if the amount of errors detected by the adaptive equalizer 111 is small, the decision sample $\tilde{S}$ can be approximated as equal to the desired signal S(0). Being a data signal, the autocorrelation of the decision sample can be represented as 1, and the following relations hold in the case of the sub-array processor 105$_2$:

$$E[S^*(\mathbf{0})\cdot\tilde{S}(\mathbf{0})] \approx E[S^*(\mathbf{0})\cdot S(\mathbf{0})] = 1 \tag{5}$$

$$E[S^*(\tau)\cdot\tilde{S}(\mathbf{0})] \approx E[S^*(\tau)\cdot S(\mathbf{0})] = 1 \tag{6}$$

Substituting Equations (5) and (6) into Equation (4) results in the following weight coefficient vector W which is produced by the correlators 208$_1$~208$_N$ of sub-array processor 105$_2$:

$$W = \begin{bmatrix} W_1 \\ W_2 \\ \cdot \\ \cdot \\ W_N \end{bmatrix} = h_0^* \begin{bmatrix} 1 \\ \exp(+j\phi_1) \\ \cdot \\ \cdot \\ \exp(+jN\phi_1) \end{bmatrix} \tag{7}$$

The sub-antenna output signals $r_1$~$r_N$ are weighted by the respective components of the weight coefficient vector W in the complex multipliers 205$_1$~205$_N$. The weighted antenna signals are summed together in the adder 209 to produce the following output signal $Y_2$ from the sub-array processor 105$_2$.

$$Y_2 = r^T W = [r_1, r_2, \ldots, r_N] \begin{bmatrix} W_1 \\ W_2 \\ \cdot \\ \cdot \\ W_N \end{bmatrix} \tag{8}$$

$$= h_0 S(0)[1, \exp(-j\phi_1), \ldots, \exp(-jN\phi_1)] h_0^* \begin{bmatrix} 1 \\ \exp(+j\phi_1) \\ \cdot \\ \cdot \\ \exp(+jN\phi_1) \end{bmatrix} + h_1 S(\tau)[1, \exp(-j\phi_2), \ldots, \exp(-jN\phi_2)] h_0^* \begin{bmatrix} 1 \\ \exp(+j\phi_1) \\ \cdot \\ \cdot \\ \exp(+jN\phi_1) \end{bmatrix}$$

$$= N \cdot h_0^* \cdot h_0 \cdot S(0) + h_0^* \cdot h_1 \sum_{n=0}^{N} \exp\{jn(\phi_1 - \phi_2)\} S(\tau)$$

The first term of Equation (8) represents the main signal S(0), where the product $h_0 \cdot h^*_0$ is the power of the main impulse response. The input signals to adder 209 have been aligned in phase and their amplitudes squared before being applied to it. Thus, the conditions for a maximal ratio combining are met for the main signal S(0). The second term of Equation (8) is concerned with the delayed signal S($\tau$). The components of the delayed signal are not squared. Instead, the product $h_0 \cdot h^*_1$ is a product of the impulse responses of the main and delayed signals. Since these impulse responses are affected by uncorrelated fades, they can be treated as noise. While the second term indicates a total sum of the components of the delayed signal S($\tau$) received by the sub-antennas 102$_1$~102$_N$, it is clear that they are not maximal-ratio combined.

Therefore, the power level of the delayed signal S($\tau$) represented by the second term of Equation (8) is much lower than that of the desired signal S(0) represented by the first term. In this way, the beams of the sub-antennas 102$_1$~102$_N$ are steered by each sub-array processor toward the desired signal source 200.

The sub-array processor 105$_1$ is used for steering the directional patterns of the sub-antennas to the undesired signal source U by setting the factor "n" of delay element 210 to "2" to receive the delayed component S($\tau$). For the sub-array processor 105$_1$, the decision output sample from equalizer 111 to correlators 208$_1$~208$_N$ is represented as $\tilde{S}(2\tau+\alpha)$ and the other inputs to these correlators are represented as S($\tau+\alpha$) as in the case of the sub-array processor 105$_2$. At reference timing t=0, correlations are taken between a received sample S(0) and a decision output sample $\tilde{S}(\tau)$. Thus, in the case of sub-array processor 105$_1$, the outputs of correlators 208$_1$~208$_N$ are expressed as follows:

$$W = \begin{bmatrix} W_1 \\ W_2 \\ \cdot \\ \cdot \\ W_N \end{bmatrix} = E[r^* \cdot \tilde{S}(\tau)] \tag{9}$$

$$= h_0^* E[S^*(0) \cdot \tilde{S}(\tau)] \begin{bmatrix} 1 \\ \exp(+j\phi_1) \\ \cdot \\ \cdot \\ \exp(+jN\phi_1) \end{bmatrix} +$$

-continued $$h_1^* E[S^*(0)\cdot \tilde{S}(\tau)]\begin{bmatrix}1\\ \exp(+j\phi_2)\\ \cdot\\ \cdot\\ \cdot\\ \exp(+jN\phi_2)\end{bmatrix}$$

Substituting Equations (5) and (6) into Equation (9) gives the following weight coefficient vector W for sub-array processor $105_1$:

$$W=\begin{bmatrix}W_1\\ W_2\\ \cdot\\ \cdot\\ \cdot\\ W_N\end{bmatrix}=h_1^*\begin{bmatrix}1\\ \exp(+j\phi_2)\\ \cdot\\ \cdot\\ \cdot\\ \exp(+jN\phi_2)\end{bmatrix} \tag{10}$$

Hence, the output signal $Y_1$ of sub-array processor $\mathbf{105}_1$ is given by:

$$\begin{aligned}Y_1 = r^T\cdot W = [r_1, r_2, \ldots, r_N]\begin{bmatrix}W_1\\ W_2\\ \cdot\\ \cdot\\ \cdot\\ W_N\end{bmatrix} \\ = h_0\cdot S(0)[1, \exp(-j\phi_1), \ldots, \exp(-j\phi_1)]h_1^*\begin{bmatrix}1\\ \exp(+j\phi_2)\\ \cdot\\ \cdot\\ \cdot\\ \exp(+jN\phi_2)\end{bmatrix} + \\ h_1\cdot S(\tau)[1, \exp(-j\phi_2), \ldots, \exp(-j\phi_2)]h_1^*\begin{bmatrix}1\\ \exp(+j\phi_2)\\ \cdot\\ \cdot\\ \cdot\\ \exp(+jN\phi_2)\end{bmatrix} \\ = h_1^*\cdot h_0 \sum_{n=0}^{N} \exp\{jn(\phi_2-\phi_1)\}S(0) + N\cdot h_1^*\cdot h_1\cdot S(\tau)\end{aligned} \tag{11}$$

From Equation (11) it is seen that the first term is a signal that can be treated as noise and the second term represents the delayed signal S(τ) which is obtained by maximal ratio combining. Therefore, the sub-antennas $\mathbf{105}_1$~$\mathbf{105}_N$ are all steered toward the undesired signal source A for the sub-array processor $\mathbf{105}_1$.

Next, the sub-array processor $\mathbf{105}_3$ is used for steering the sub-antennas toward an undesired signal source, not shown, by setting the factor "n" of delay element 210 to "0". This undesired signal source produces a signal S(−τ) whose timing is advanced with respect to the main-path signal S(0). If the phase-advancing signal is arriving at an angle $\theta_3$, there is a phase difference of $\phi_3=\pi\cdot\sin\theta_3$ between adjacent sub-antennas $\mathbf{102}_1$~$\mathbf{102}_N$. Consider a simplified, two-wave multipath propagation model for the main signal and the phase-advancing signal. In this case, the delayed components S(τ) of the second term of Equation (3) are replaced with phase-advancing components S(−τ) as follows:

$$r=\begin{bmatrix}r_1\\ r_2\\ \cdot\\ \cdot\\ \cdot\\ r_N\end{bmatrix}=h_0S(0)\begin{bmatrix}1\\ \exp(-j\phi_1)\\ \cdot\\ \cdot\\ \cdot\\ \exp(-jN\phi_1)\end{bmatrix}+h_{-1}S(-\tau)\begin{bmatrix}1\\ \exp(-j\phi_3)\\ \cdot\\ \cdot\\ \cdot\\ \exp(-jN\phi_3)\end{bmatrix} \tag{12}$$

where, $h_{-1}$ is the sample value at t=−τ of the channel impulse response. As a result, the decision output sample from equalizer 111 to correlators $\mathbf{208}_1$~$\mathbf{208}_N$ sub-array processor $\mathbf{105}_3$ can be represented as $\tilde{S}(\alpha)$ and the other inputs to these correlators are signals S(τ+α). Therefore, if the reference timing is set equal to t=O, correlations are taken between the signals given by Equation (12) and a phase-advancing decision output sample $\tilde{S}(-\tau)$. Thus, the correlators $\mathbf{208}_1$~$\mathbf{208}_N$ produce the following weight coefficient vector:

$$\begin{aligned}W=\begin{bmatrix}W_1\\ W_2\\ \cdot\\ \cdot\\ \cdot\\ W_N\end{bmatrix}=E[r^*\cdot\tilde{S}(-\tau)] \\ = h_0^*\cdot E[S^*(0)\cdot\tilde{S}(-\tau)]\begin{bmatrix}1\\ \exp(+j\phi_1)\\ \cdot\\ \cdot\\ \cdot\\ \exp(+jN\phi_1)\end{bmatrix} + \\ h_{-1}^*\cdot E[S^*(-\tau)\cdot\tilde{S}(-\tau)]\begin{bmatrix}1\\ \exp(+j\phi_3)\\ \cdot\\ \cdot\\ \cdot\\ \exp(+jN\phi_3)\end{bmatrix} \\ = h_{-1}^*\begin{bmatrix}1\\ \exp(+j\phi_3)\\ \cdot\\ \cdot\\ \cdot\\ \exp(+jN\phi_3)\end{bmatrix}\end{aligned} \tag{13}$$

Accordingly, the output signal $Y_3$ of the sub-array processor $\mathbf{105}_3$ is a convolution of Equations (12) and (13), which is given in the form:

$$\begin{aligned}Y_3 &= r^T\cdot W \\ &= h_{-1}^*\cdot h_0 \sum_{n=0}^{N}\exp\{jn(\phi_3-\phi_1)\}S(0) + \\ &\quad N\cdot h_{-1}^*\cdot h_{-1}\cdot S(-\tau)\end{aligned} \tag{14}$$

From Equation (14), it is seen that the first term can be treated as noise and the second term is the phase-advancing signal S(−τ) which is obtained by maximal ratio combining. Thus, the directional patterns of sub-antennas $\mathbf{102}_1$~$\mathbf{102}_N$ are oriented toward the phase-advancing signal source for the sub-array processor $\mathbf{105}_3$.

As illustrated in FIG. 1, the outputs of sub-array processors $\mathbf{105}_2$ and $\mathbf{105}_3$ are provided with delay elements 106 and 107, respectively. By representing the outputs of the delay elements 106 and 107 as $Y_2(\tau)$ and $Y_3(2\tau)$, respectively, Equations (8) and (14) are rewritten into Equations (15) and (16), respectively, as follows:

$$Y_2(\tau) = N\cdot h_0^*\cdot h_0\cdot S(\tau) + h_0^*\cdot h_1 \sum_{n=0}^{N}\exp\{jn(\phi_1-\phi_2)\}S(2\tau) \tag{15}$$

$$Y_3(2\tau) = h_{-1}^*\cdot h_0 \sum_{n=0}^{N}\exp\{jn(\phi_3-\phi_1)\}S(2\tau) + N\cdot h_{-1}^*\cdot h_{-1}\cdot S(\tau) \tag{16}$$

As a result, the output signal Y of adder 108 is given by:

$$\begin{aligned}Y &= Y_1 + Y_2(\tau) + Y_3(2\tau) \\ &= N(h_{-1}^*\cdot h_{-1} + N\cdot h_0^*\cdot h_0 + h_1^*\cdot h_1)S(\tau) + ISI\end{aligned} \tag{17}$$

where, ISI is a term resulting from intersymbol interference. The ISI term contains S(0) and S(2τ) and implies that S(τ) is the desired signal and S(0) and S(2τ) are taken as the intersymbol interference for S(τ), which is given by Equation (18) as follows:

$$ISI = h_1^* \cdot h_0 \sum_{n=0}^{N} \exp\{jn(\phi_2 - \phi_1)\}S(0) + \sum_{n=0}^{N} [h_0^* h_1 \exp\{jn(\phi_1 - \phi_2)\} + h_{-1}^* h_0 \exp\{jn(\phi_3 - \phi_1)\}]S(2\tau) \quad (18)$$

It is seen that the sub-array processors 105$_1$~105$_3$ cooperate with each other to function as groups for respective steering angles of the sub-antennas. Equation (17) shows that the signals $S(\tau)$ received by the respective functioning groups of the sub-array processors are maximal-ratio combined by adder 108. More specifically, the sum of the autocorrelations of the phase-advance impulse response $h_{-1}$, the main impulse response $h_0$ and the delayed impulse response $h_1$ is converged to the reference time $t=\tau$ and maximal-ratio combined in the time domain. The effect of the time-domain maximal-ratio combining advantageously enhances the effect of the space-domain maximal-ratio combining performed by the adaptive matched filter 109.

As shown in FIG. 1, the output signal Y of the sub-array branches is maximal-ratio combined in the adder 110 with the output signal of the main antenna branch whose signal-to-noise ratio is maximized by the adaptive matched filter 109. The output of the adder 110 contains the ISI term of Equation (17) caused by interference from the S(0) and $S(2\tau)$ symbols as represented by Equation (18). Adaptive equalizer 111 is preferably a well-known decision feedback equalizer which includes a forward filter for receiving the output of adder 110 to supply its output to one input of a subtractor, a backward filter connected in a loop between the output of a decision circuit and a second input of the subtractor. An error detector is connected across the input and output of the decision circuit to supply a decision error of the decision circuit to the forward and backward filters for updating their tap-weight coefficients according to the least-mean-square algorithm so that the precursor S(0) and postcursor $S(2\tau)$ of the channel impulse response are removed by the forward and backward filters, respectively.

Figure 3:
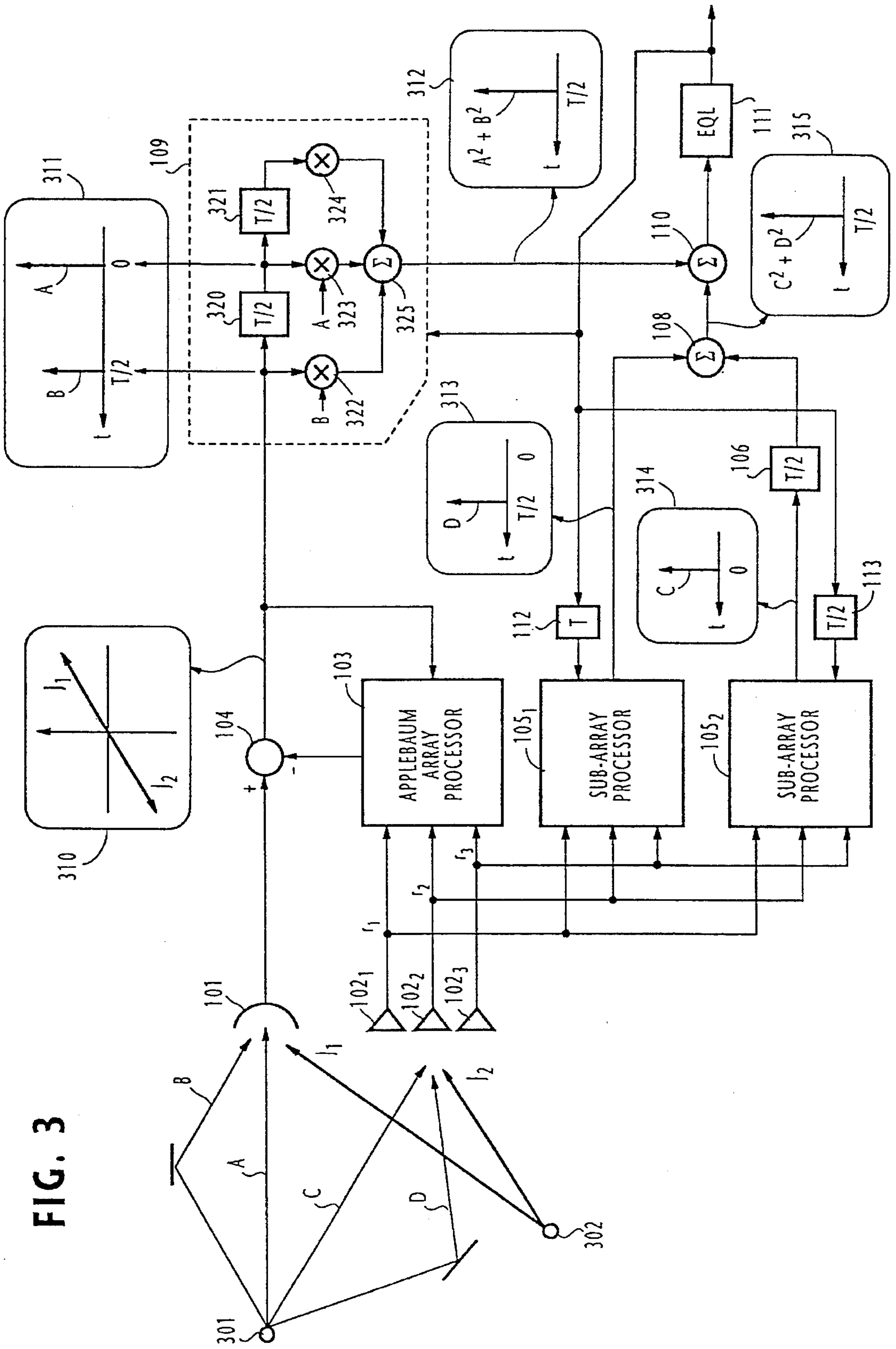
FIG. 3 is a block diagram useful for describing the operation of the sidelobe canceler of FIG. 1 in a simplified form.

While a description has been made on the quantitative aspect of the present invention, it is appropriate to discuss the simultaneous implementation of interference cancellation and diversity combining in qualitative terms with reference to FIG. 3. For simplicity, only three sub-antennas 102$_1$~102$_3$ and two sub-array processors 105$_1$ and 105$_2$ are shown. It is also shown that the adaptive matched filter 109 has three delay-line taps spaced at $\tau=T/2$ intervals, where T is the symbol interval.

In a two-wave propagation model, it is assumed that a desired signal is transmitted from a source 301 and propagated over a direct, main-path A to the main antenna 101 and over a delayed path B to the same main antenna. The signal from the source 301 is also received by the sub-antenna array 102 over a direct, main-path C and a delayed path D. A jamming signal is transmitted from a source 302 and is received as a vector $J_1$ by the main antenna 101 and as a vector $J_2$ by the sub-antenna array 102.

The weight coefficients of the Applebaum array processor 103 are adaptively controlled in response to the output of subtractor 104 so that it causes the sub-antennas 102$_1$~102$_3$ to form their beam in the arrival direction of vector $J_2$ to produce its replica. As shown in a vector diagram 310, the replica of vector $J_2$ is equal in amplitude to the vector $J_1$, so that when it is combined in subtractor 104 with the main antenna output, the jamming component $J_1$ is canceled.

Sub-array processor 105$_1$ causes the sub-antenna array 102 to form a beam aligned in the delayed path D so that it produces an impulse response of amplitude D at time t=T/2 as shown at 313. Sub-array processor 105$_2$ causes the sub-antenna array 102 to form a beam aligned to the delayed path C so that it produces an impulse response of amplitude C at time t=0 as shown at 314. The output of processor 105$_2$ is delayed by T/2 at delay element 106 and combined in phase with the output of processor 105$_1$, producing a maximal-ratio combined impulse response of amplitude $C^2+D^2$ at t=T/2 as indicated at 315.

On the other hand, the delay-dispersed desired signals from paths A and B are time-dispersed on the tapped-delay line of matched filter 109 as impulse responses A and B as indicated at 311. Matched filter 109 includes first and second delay elements 320 and 321 connected to form a center delay-line tap therebetween and tap-weight multipliers 322, 323 and 324 connected respectively to the first, non-delayed tap, the center tap and the third tap of the delay line. Thus, when the impulse response A appears at the center (reference) tap at time t=0, the impulse response B appears at t=T/2 at the first delay-line tap, as indicated at 311. Matched filter 109 includes a tap-weight controller, not shown, which controls the tap-weight coefficients of the multipliers 323 and 322 so that they equal in amplitude to the impulse responses A and B. Thus, the impulse responses A and B are squared and summed together in an adder 325 to produce an output $A^2+B^2$ at time t=T/2 as shown at 312. Since the outputs of matched filter 109 and adder 108 are both time-aligned with each other at t=T/2, they are maximal-ratio combined at combiner 110.

It is seen therefore that, in a general sense, the delay elements 106, 107 are associated with (M−1) sub-array processors and introduce different amounts of delay so that the output signal of the i-th sub-array processor is delayed by an amount equal to $(i-1)\tau$, and i=2,3, . . . , M. On the other hand, the delay elements 112 and 113 are associated with (M−1) of the sub-array processors and introduce different amounts of delay so that the decision signal applied to the j-th sub-array processor is delayed by an amount equal to $(M-j)\tau$, where j=1,2, . . . , M−1. The total amounts of delay associated with each of the M sub-array processors is equal to $(M-1)\tau$, i.e., $2\tau$ in the illustrated embodiment.

Figure 4:
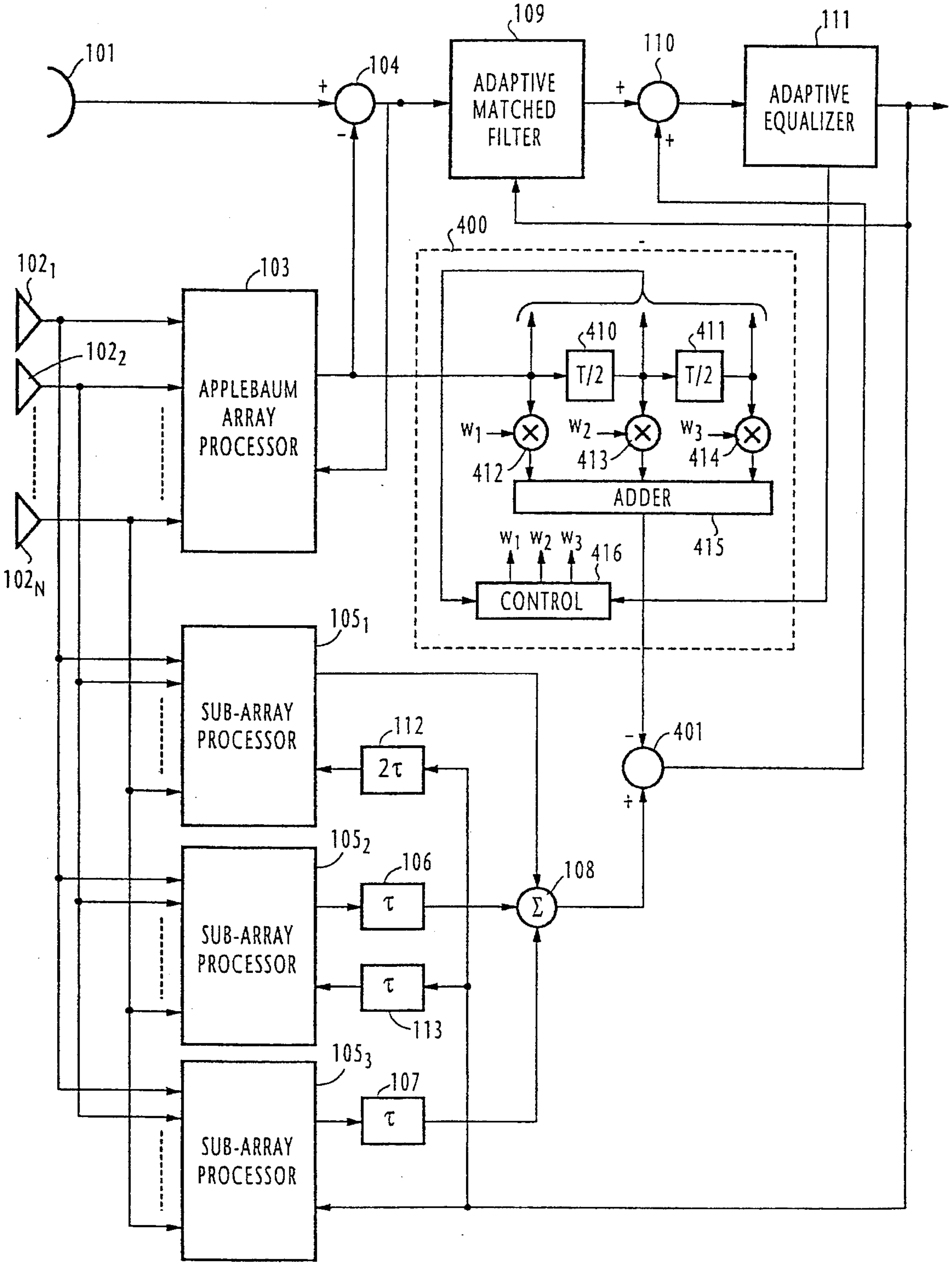
FIG. 4 is a block diagram of a sidelobe canceler according to a second embodiment of the present invention.

A second embodiment of the present invention is illustrated in FIG. 4. The sidelobe canceler of the second embodiment differs from the first embodiment by the additional inclusion of a transversal filter 400 of well known design. The tapped-delay line of the transversal filter 400 is connected to the output of the Applebaum array processor 103 to produce an interference canceling signal for canceling an interfering signal undesirably received by the sub-antenna array 102 if the arrival angle of the jamming signal substantially coincides with the arrival angle of the desired signal, either direct or delayed components. The output of transversal filter 400 is applied to a subtractor 401 where it is subtracted from the output of adder 108 to cancel the jamming signal in the output of adder 108. The output of subtractor 401 is applied to adder 110. Adaptive equalizer 111, or decision-feedback equalizer supplies its decision error to the transversal filter 400 to control its tap weights. Since the jamming signal is uncorrelated with the desired signal, it cannot be treated as intersymbol interference.

Transversal filter 400 includes a tapped-delay line formed by a cascade connection of delay elements of delay time $\tau=T/2$. Only two delay elements 410 and 411 are shown for purposes of illustration. To the successive taps of the delay line are connected tap weight multipliers 412, 413, 414 for weighting the tap signals on the delay line with corresponding weight coefficients produced by a tap-weight controller 416. The weighted tap signals are summed by an adder 415 and supplied to the subtractor 401. Controller 416 receives the decision error from the adaptive equalizer 111 and the tap signals from the delay line to determines the correlations between them according to the MMSE (minimum mean square error) algorithm so that the decision error is reduced to a minimum. Tap-weight coefficient signals $w_1$, $w_2$, $w_3$ representing the correlations are generated and applied to the tap-weight multipliers 412~413, respectively. By performing the MMSE control on the output of the Applebaum array processor 103, the transversal filter 400 produces an estimated spectrum of the jamming signal which is undesirably detected by the sub-antenna array 102.

Figure 5:
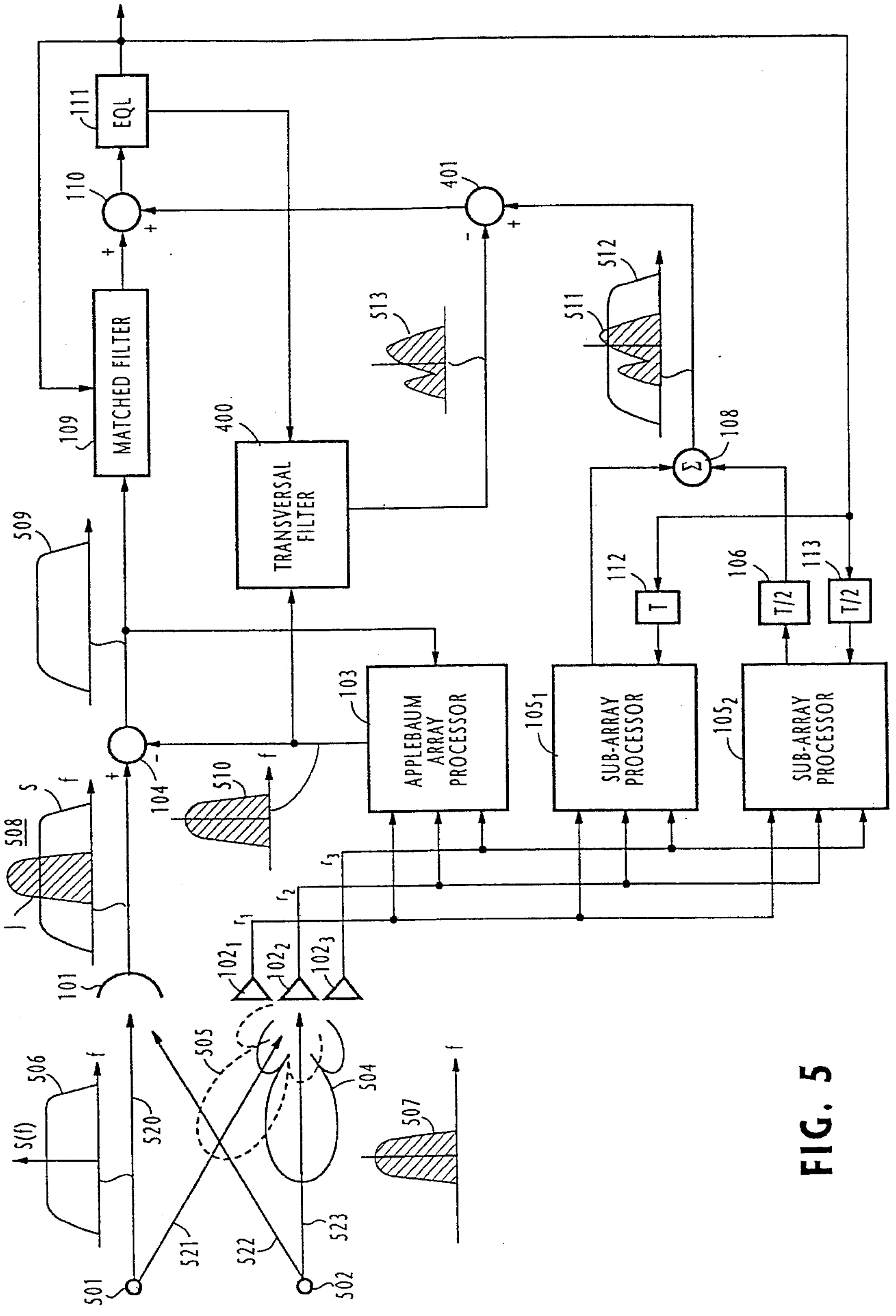
FIG. 5 is a block diagram useful for describing the operation of the sidelobe canceler of FIG. 4 in a simplified form.

The operation of the sidelobe canceler of FIG. 4 will be described with reference to FIG. 5. In a certain spatial configuration, the main antenna 101 receives a desired and a jamming signal from sources 501 and 502 over propagation paths 520, 522, respectively, and the sub-antenna array 102 receives the same signals over propagation paths 521, 523. The desired signal has a flat response over a wide frequency spectrum 506, while the jamming signal has a narrow spectrum 507. The output of the main antenna 101 has a spectrum 508 containing a mix of the desired signal S and jamming signal J.

The Applebaum array processor 103 control the control loop through the subtractor 104 so that the sub-antenna array 102 forms a beam 504 whose mainlobe is oriented toward the jamming signal source 502 to detect the jamming signal J and produces a canceling signal having a spectrum 510. The spectrum 510 is applied to the subtractor 104 where the jamming signal contained in the output of main antenna 101 is canceled, producing a replica of the desired signal at the output of subtractor 104 having the same frequency spectrum as the transmitted signal as shown at 509.

If the sub-array processor $\mathbf{105_1}$ causes the sub-antenna array 102 to form a beam pattern 505 whose mainlobe is pointed toward the desired signal source 501, the sidelobe of the beam pattern will be pointed toward the jamming signal source 502. A similar beam pattern is formed by the same sub-antenna array 102 under the control of the sub-array processor $\mathbf{105_2}$. Therefore, a low-level jamming signal and a high-level desired are detected and combined by the sub-array processors $\mathbf{105_1}$ and $\mathbf{105_2}$. The output of processor $\mathbf{105_1}$ is applied direct to adder 108, while the output of processor $\mathbf{105_2}$ is delay by T/2 in the delay element 106 and applied to adder 108 where it is maximal-ratio combined with the output of processor $\mathbf{105_1}$, producing a signal with a spectrum which is shaped as shown at 511 and a wide spectrum 512 of the desired signal.

If the bandwidth of the jamming signal is as wide as the spectrum of the desired signal, the delay element 106 would produce a multipath fading effect on the jamming component of the output of sub-array processor $\mathbf{105_2}$. This implies that, even if the spectrum 507 of the jamming signal is not shaped by a frequency-selective fade, the spectrum of the jamming signal component of the output of adder 108 is shaped by a fixed frequency-selective fade as shown at 511. A wide spectrum 512 of the desired signal is mixed with the jamming signal spectrum 511 and applied to the subtractor 401.

Transversal filter 400 shapes the spectrum of the jamming signal extracted by the Applebaum array processor 103 according to the MMSE algorithm so that it produces an estimated jamming spectrum 513 that conforms to the jamming spectrum 511. The tap-weight updating speed of the transversal filter 400 is set so that it substantially differs from the tap-weight updating speed of the adaptive equalizer 111 to allow them to operate independently.

What is claimed is:

1. A sidelobe canceler comprising:

a main antenna;

an array of sub-antennas;

a subtractor having a first input connected to the main antenna and a second input;

a main-array processor having a plurality of first weight multipliers for multiplying output signals of said sub-antennas with weight coefficients, a first weight controller for detecting correlations between the output signals of the sub-antennas and an output signal of said subtractor and deriving therefrom the weight coefficients of said first multipliers, and a first adder for summing output signals of said first multipliers to produce an output signal and supplying the output signal to the second input of the subtractor as an interference canceling signal;

an adaptive matched filter for receiving the output signal of the subtractor and producing an output signal having a maximized signal-to-noise ratio;

M sub-array processors each having a plurality of second multipliers for multiplying the output signals of said sub-antennas with weight coefficients, a second weight controller for detecting correlations between the output signals of the sub-antennas and a decision signal and deriving therefrom the weight coefficients of the second multipliers, and a second adder for summing output signals of the second multipliers to produce an output signal of each of the sub-array processors;

a first diversity combiner for combining the output signals of the M sub-array processors to produce a first diversity-combined signal;

a second diversity combiner for combining the first diversity-combined signal with the output signal of the matched filter to produce a second diversity-combined signal;

an adaptive equalizer for removing intersymbol interference from the second diversity-combined signal to produce said decision signal and applying the decision signal to said sub-array processors;

first (M−1) delay elements for respectively introducing different amounts of delay to the output signals of (M−1) of the sub-array processors so that the output signal of the i-th sub-array processor is delayed by an amount equal to $(i-1)\tau$, where $i=2,3, \ldots, M$ and $\tau$ is a predetermined delay time; and second (M−1) delay elements for respectively introducing different amounts of delay to the decision signals applied to (M−1) of the sub-array processors so that the decision signal applied to the j-th sub-array processor is delayed by an amount equal to $(M-j)\tau$, where $j=1,2, \ldots, M-1$, wherein the total amounts of delay associated with each of the M sub-array processors is equal to $(M-1)\tau$.

2. A sidelobe canceler as claimed in claim 1, further comprising:

a transversal filter having a tapped-delay line connected to be responsive to the output signal of the main-array processor, a plurality of tap-weight multipliers connected respectively to successive taps of the tapped-delay line for multiplying tap signals at the corresponding taps with weight coefficients, an adder for summing output signals of said multipliers to produce an output signal of the transversal filter which represents a shaped frequency spectrum of the output signal of said main-array processor, and a tap-weight control circuit for determining correlations between said tap signals and a decision error signal supplied from said adaptive equalizer and deriving therefrom said weight coefficients; and means for combining the output signal of the transversal filter with the first diversity-combined signal for canceling interfering signals introduced to the input signals of said sub-array processors to produce an interference-canceled signal and supplying the interference canceled signal to the second diversity combiner, instead of the first diversity-combined signal.

3. A sidelobe canceler as claimed in claim 1 or 2, wherein the weight controller of each of said M sub-array processors comprises:

a plurality of correlators for respectively receiving signals from said sub-antennas, one of the correlators of the M sub-array processors receiving the decision signal from said adaptive equalizer and each of the correlators of the other sub-array processors receiving the decision signal via a respective one of said first delay elements, said correlators determining said correlations and deriving therefrom said weight coefficients of the second multipliers; and a plurality of delay elements for introducing a predetermined amount of delay to each of the signals from said sub-antennas to said correlators.

4. A sidelobe canceler as claimed in claim 1 or 2, wherein the first weight controller of said main-array processor is an Applebaum weight controller which combines a steering vector that estimates the direction of arrival of a target signal with said correlations to derive therefrom said weight coefficients of the first multipliers.

5. In a sidelobe canceler comprising:

a main antenna;

an array of sub-antennas;

a subtractor having a first input connected to the main antenna and a second input;

a main-array processor having a plurality of first weight multipliers for multiplying output signals of said sub-antennas with weight coefficients, a first weight controller for detecting correlations between the output signals of the sub-antennas and an output signal of said subtractor and deriving therefrom the weight coefficients of said first multipliers, and a first adder for summing output signals of said first multipliers to produce an output signal and supplying the output signal to the second input of the subtractor as an interference canceling signal;

an adaptive matched filter for receiving the output signal of the subtractor and producing an output signal having a maximized signal-to-noise ratio;

M sub-array processors each having a plurality of second multipliers for multiplying the output signals of said sub-antennas with weight coefficients, a second weight controller for detecting correlations between the output signals of the sub-antennas and a decision signal and deriving therefrom the weight coefficients of the second multipliers, and a second adder for summing output signals of the second multipliers to produce an output signal of each of the sub-array processors, a method comprising the steps of:

a) combining the output signals of the M sub-array processors into a first diversity-combined signal;

b) combining the first diversity-combined signal with the output signal of the matched filter to produce a second diversity-combined signal;

c) removing intersymbol interference from the second diversity-combined signal according to a decision error to produce said decision signal and applying the decision signal to said sub-array processors;

d) respectively introducing different amounts of delay to the output signals of (M−1) of the sub-array processors so that the output signal of the i-th sub-array processor is delayed by an amount equal to $(i-1)\tau$, where $i=2,3, \ldots, M$ and $\tau$ is a predetermined delay time; and e) respectively introducing different amounts of delay to the decision signals applied to (M−1) of the sub-array processors so that the decision signal applied to the j-th sub-array processor is delayed by an amount equal to $(M-j)\tau$, where $j=1,2, \ldots, M-1$, wherein the total amounts of delay associated with each of the M sub-array processors is equal to $(M-1)\tau$.

6. In a sidelobe canceler comprising:

a main antenna;

an array of sub-antennas;

a subtractor having a first input connected to the main antenna and a second input;

a main-array processor having a plurality of first weight multipliers for multiplying output signals of said sub-antennas with weight coefficients, a first weight controller for detecting correlations between the output signals of the sub-antennas and an output signal of said subtractor and deriving therefrom the weight coefficients of said first multipliers, and a first adder for summing output signals of said first multipliers to produce an output signal and supplying the output signal to the second input of the subtractor as an interference canceling signal;

an adaptive matched filter for receiving the output signal of the subtractor and producing an output signal having a maximized signal-to-noise ratio;

M sub-array processors each having a plurality of second multipliers for multiplying the output signals of said sub-antennas with weight coefficients, a second weight controller for detecting correlations between the output signals of the sub-antennas and a decision signal and deriving therefrom the weight coefficients of the second multipliers, and a second adder for summing output signals of the second multipliers to produce an output signal of each of the sub-array processors; and an adaptive equalizer for removing intersymbol interference according to a decision error to produce said decision signal and applying the decision signal to said sub-array processors, a method comprising the steps of:

a) combining the output signals of the M sub-array processors into a first diversity-combined signal;

b) transversal-filtering the frequency spectrum of the output signal of said main-array processor using the decision error of said adaptive equalizer according to a minimum means square error algorithm to produce a signal which is shaped to conform to an interfering signal introduced to said M sub-array processors;

c) combining the signal produced by the step (b) with the first diversity combined signal to cancel said interfering signal introduced to said M sub-array processors;

d) combining the interference-canceled first diversity-combined signal with the output signal of the matched filter to produce a second diversity-combined signal and applying the second diversity-combined signal to said adaptive equalizer to remove said intersymbol interference from the second diversity combined signal;

e) respectively introducing different amounts of delay to the output signals of (M–1) of the sub-array processors so that the output signal of the i-th sub-array processor is delayed by an amount equal to (i–1)τ, where i=2,3, . . . , M and τ is a predetermined delay time; and f) respectively introducing different amounts of delay to the decision signals applied to (M–1) of the sub-array processors so that the decision signal applied to the j-th sub-array processor is delayed by an amount equal to (M–j)τ, where j=1,2, . . . , M–1, wherein the total amounts of delay associated with each of the M sub-array processors is equal to (M–1)τ.

* * * * *